E. P. Russell,
Mower.

No. 46,394.     Patented Feb. 14, 1865.

Witnesses:
R. F. Campbell
C. Shafer

Inventor:
E. P. Russell
by his Atty's
Mason, Fenwick & Lawrence

UNITED STATES PATENT OFFICE.

E. P. RUSSELL, OF MANLIUS, NEW YORK.

IMPROVEMENT IN HARVESTING-MACHINES.

Specification forming part of Letters Patent No. 46,394, dated February 14, 1865.

*To all whom it may concern:*

Be it known that I, E. P. RUSSELL, of Manlius, Onondaga county, State of New York, have invented a new and useful Improvement in Harvesting-Machines; and I do hereby declare that the following is a full, clear, and exact description thereof, reference being had to the accompanying drawings, making a part of this specification, in which—

Figure 1:
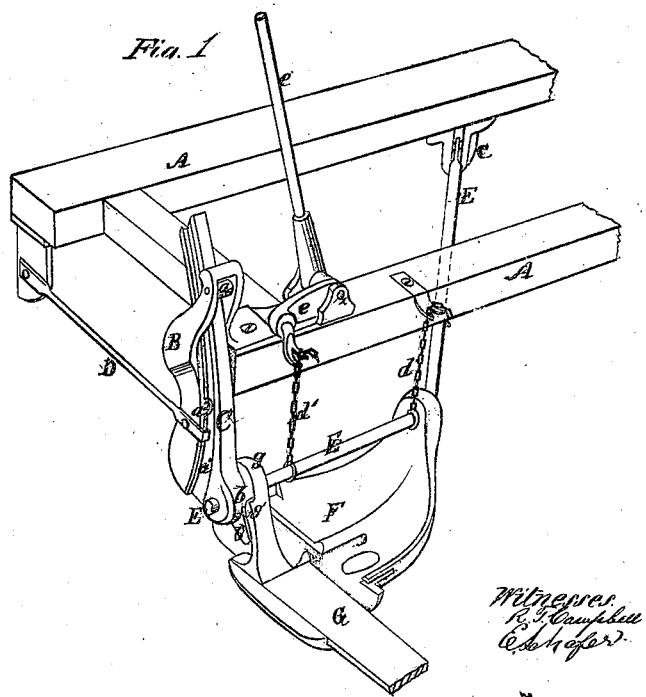
Figure 2:
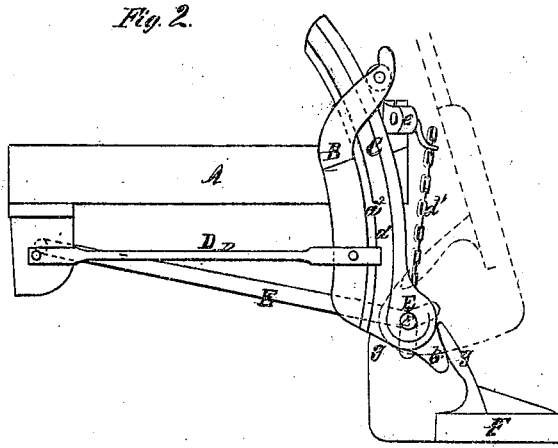
Figure 3:
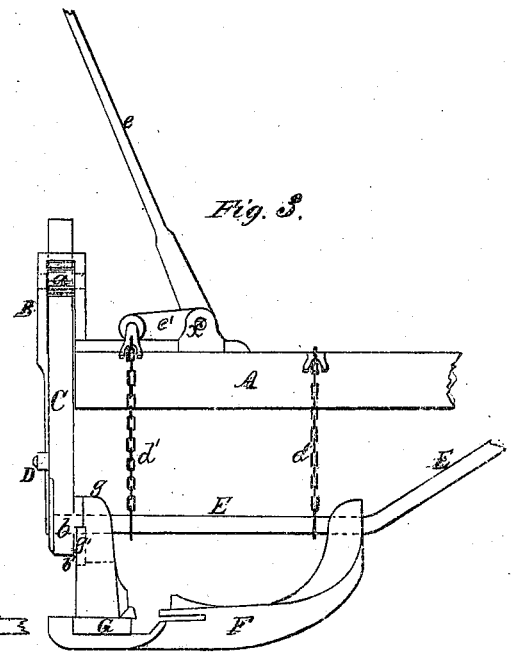

Figure 1 is a perspective view of my invention applied to the frame of a harvesting-machine. Fig. 2 is a rear end elevation of Fig. 1. Fig. 3 is a side elevation of Figs. 1 and 2.

Similar letters of reference indicate corresponding parts in the several figures.

This invention relates to certain novel improvements in attaching the cutting apparatus of a reaping or mowing machine to the frame thereof, so as to allow the cutting apparatus to rise and fall and accommodate itself to hilly land or to inequalities in the surface of the ground; also, to allow the cutting apparatus to be thrown up and folded over the frame of the machine when it is not in immediate use; and, finally, to allow the cutting apparatus to be elevated bodily over obstructions in its path.

The main object of my invention is to attach the cutting apparatus—*i. e.*, the finger-bar and sickle—to the frame of the machine in such manner that I am enabled to dispense with a "double-joint" or "double-rule-joint" connection, and yet employ a diagonal brace extending across the carriage-frame and sustaining the cutting apparatus against backward strain, as will be hereinafter described.

To enable others skilled in the art to make and use my invention, I will describe its construction and operation.

In the accompanying drawings, A represents a portion of the frame of a harvesting-machine, and B represents a curved guide, which is suitably secured to the rear end of the frame A, and which extends above and below this frame, as shown in Figs. 1 and 2. The upper end of said guide B is curved over and perforated, so as to form an eye, one side of which consists of an anti-friction roller, $a$.

C represents a curved hanger, which has an enlarged cylindrical shoulder, $b$, formed on its lower end, projecting from which is a tooth, $b'$. This hanger is curved in such manner as to fit snugly against and to slide upon the curved surface of the guide B. The upper end of the hanger C passes through the eye in the upper end of guide B, and the lower portion of this hanger is held in contact with the guide B in its up and down movements by means of a hook, which is formed on one end of a horizontal transverse brace, D, and which fits into a groove, $a'$, formed in the rear side of the hanger. The projection $a^2$ in the groove $a'$ serves as a stop to prevent the hanger from slipping out of its place in its downward movement.

E represents a brace or draw-rod, which is bent in the form of an obtuse angle, so that when it is arranged as represented in Fig. 1 the forward or diagonal portion of this rod will extend across the frame A, and the rear or longitudinal portion of said rod will form a pivot-bearing for the shoe F, this longitudinal arm of the brace E being thus arranged at right angles to the line of cut. Its rear end is pivoted to the lower extremity of the sliding hanger C, and its forward end—*i. e.*, the forward end of the rod E—is pivoted on the opposite side of the frame A to a bracket, $c$. Now, by means of two supporting-chains, $d$ $d'$, which are attached at their lower ends to rod E and at their upper ends to the frame A, the horizontal or longitudinal portion of said rod can be elevated or depressed and adjusted to any desired height. To effect this adjustment quickly, the chain $d'$, which is nearest the hanger C, is attached to the short arm $e$ of a lever, $e'$, as shown in Figs. 1 and 3.

The shoe F, to which the finger-bar G is secured, is constructed with its forward and rear ends elevated, and with eyes formed longitudinally through these raised ends, through which the longitudinal portion of the draw-bar E passes, thus constituting this bar a means for pivoting the cutting apparatus to the machine, so that its outer end will rise and fall and adjust itself to uneven surfaces. Besides this motion, I provide for allowing the rear end of the shoe and its attachments to rise or fall independently of the supporting-bar E, to do which I form a vertical oblong slot through the rear elevation of the shoe F, and enlarge the eye at the forward portion of said shoe sufficiently to allow the rear end of this shoe to rise or fall through a space equal to the length of the slot. Having thus attached the finger-bar and its shoe to the frame of the machine by a diagonal brace-rod, which relieves the team from injurious side draft, and which constitutes a pivotal connection, and also a brace for the cutting apparatus, and having dispensed with a double-rule-joint connection, I desire to support the outer end of the cutting apparatus in such manner that it may be elevated bodily above the surface of the ground by means of the lever $e$ $e'$ and chain-connection $d'$. This I accomplish by forming a lip, $g'$, on the rear elevated portion, $g$, of the shoe, which lip is acted upon by the tooth $b'$ to stiffen the finger-bar during the act of elevating the same. During the operation of cutting, this tooth $b'$ will not interfere with the rising and falling motions of the cutting apparatus, as it is arranged in such position as to check the same at the lowest point it is desired to have the outer end fall.

When it is desired to elevate the cutting apparatus, the upright portion $e'$ of the lifting-lever is pressed forward until the outer end of the short arm $e$ passes forward of the fulcrum $x$, when this arm $e$ will raise and hold the cutting apparatus, together with its brace E and hanger C, at the desired height. In this elevated position of the shoe and cutting apparatus the latter may be folded over the frame of the machine, as indicated in Fig. 2 in red.

In applying the pitman, which connects the driving-gear with the sickle, the joint of this pitman, where it is connected to the driving-crank or eccentric, can be arranged nearly concentric with the axis of motion of the draw-bar E, and hence in raising or lowering the cutting apparatus it will not materially alter the length of said pitman. The axis of the pitman is also to be concentric, or nearly so, with the circle of the sliding curved hanger, so that the cutter, in rising with the finger-beam, shall not materially change its position with respect to the guard-fingers, and thus if the ground is undulating the cutter will operate about the same as though it were a bevel plane.

From this description it will be seen that I attach the cutting apparatus to the frame of the machine by means of a secondary frame, which is so constructed as to constitute a diagonal and also a lateral brace, and a means for elevating the cutting apparatus over obstructions, using, to effect said attachment, a single joint. I avoid the necessity of using a longitudinal brace extending from the forward end of the inner shoe to the front end of the frame of the machine, inasmuch as the hanging support C, in connection with the diagonal brace extending across the machine, will resist all the backward strain upon the cutting apparatus during the operation of the machine. I furthermore obviate by my invention the necessity of employing any kind of brace on the outside of that side of the main frame nearest the standing grain.

I would here state that the angular hinge and draw-bar device E might be connected at the point $c$ by means of a spring formed on the front end of the draw-bar, so as to give up and down to the movements of the cutting apparatus, thus having but one pivotal connection instead of three, as in most harvesters, for the cutting apparatus to adjust itself and be adjusted upon.

Having thus described my invention, what I claim as new, and desire to secure by Letters Patent, is—

1. Hinging the cutting apparatus to the draft-frame by means of an angular draw-bar, which answers also as a hinge and brace for the cutting apparatus, in combination with the curved sliding hanger C, the said parts being applied to the draft-frame, substantially as shown, for the purpose of rendering a single hinge-joint in the cutting apparatus or its connections capable of serving the purposes of what is known as the "double-hinge" or "double-rule joint," as set forth.

2. The curved slotted bearing-guide B, constructed in one piece and applied to the main frame, as described, in combination with the curved stiff hanger C, arranged and operating as set forth.

3. The construction of the curved stop-tooth $b'$, formed on the hanger C, in combination with the curved lip $g'$, constructed as shown, on the shoe F, substantially as and for the purposes described.

4. The transverse rigid brace and guide D, in conjunction with the curved hanger C and curved guide B, substantially as and for the purpose described.

5. The manner shown of applying the roller $a$ within the eye of the curved guide B and upon the curved hanger C, for the purpose set forth.

E. P. RUSSELL.

In presence of—
  A. H. JEROME,
  A. REMINGTON.